Dec. 10, 1946. S. P. GHOSH 2,412,393
REFLECTOMETER CORRECTION NETWORK
Filed April 26, 1945
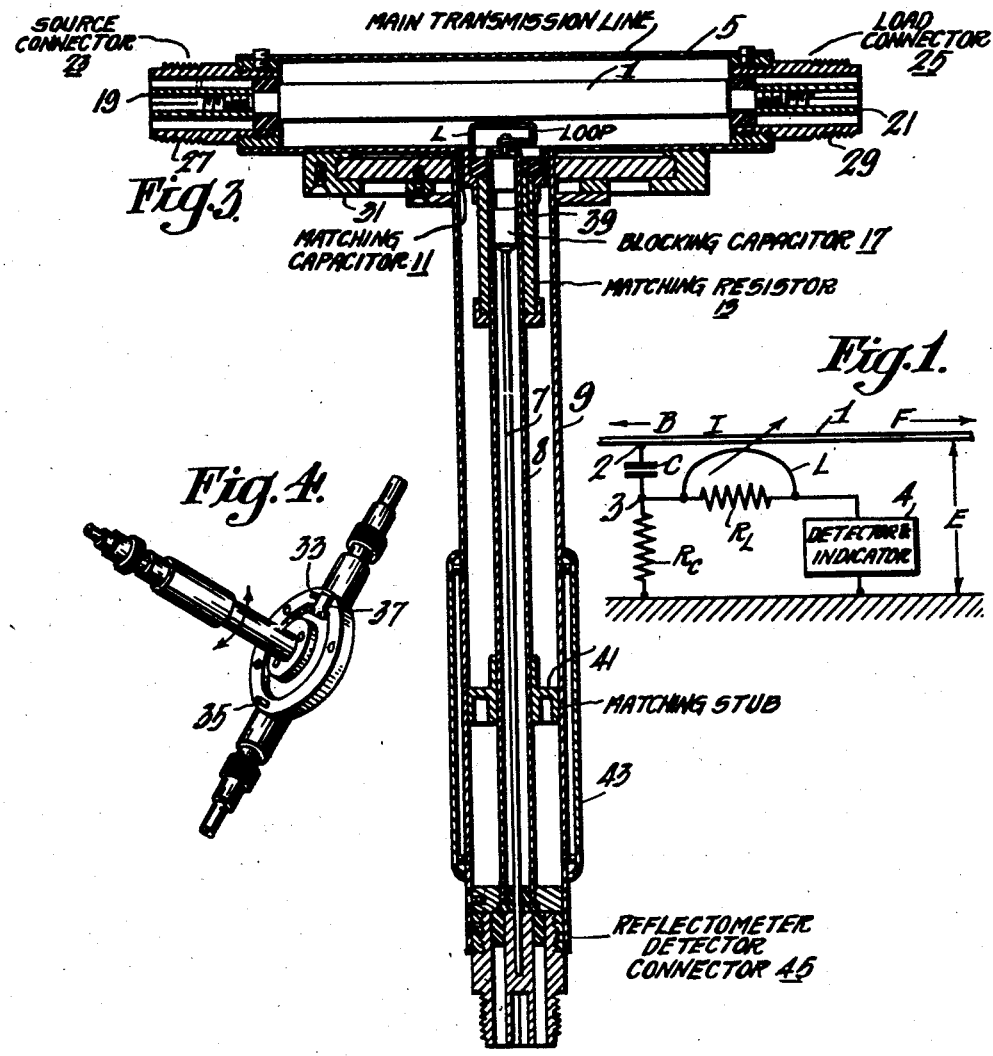
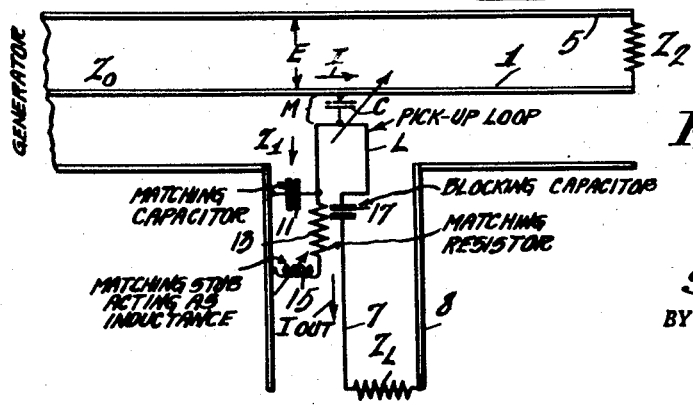
INVENTOR.
Saraju P. Ghosh
BY
ATTORNEY Patented Dec. 10, 1946

2,412,393

UNITED STATES PATENT OFFICE 2,412,393

REFLECTOMETER CORRECTION NETWORK

Saraju P. Ghosh, Camden, N. J., assignor to Radio Corporation of America, a corporation of Delaware Application April 26, 1945, Serial No. 590,400

8 Claims. (Cl. 171—95)

This invention relates generally to high-frequency wave transmission systems and more particularly to substantially non-frequency-selective reflectometers for measuring directly the magnitudes of travelling waves in high-frequency transmission lines.

Extremely useful measurements customarily made on transmission lines are of the standing wave ratio and reflection coefficient. The same information obtainable from standing wave ratio or reflection coefficient measurements may be obtained by measuring separately the forward and backward travelling wave magnitudes. Ordinarily such measurements require the use of a movable probe in order to determine the wave magnitudes at various predetermined points along the transmission line. Movable elements in ultra-high-frequency coaxial transmission lines involve difficulties due to imperfect electrical contact between the transmission line and the movable probe element, as well as errors due to field distortion caused by the probe element. Both of these features may introduce considerable error in the standing wave ratio or reflection coefficient measurements. Furthermore, such procedure heretofore has necessitated a series of at least two consecutive measurements of wave magnitudes at different points along the transmission line.

The instant invention is an improvement upon the device descibed in the copending application of Carl G. Sontheimer and Nathaniel I. Korman, Serial No. 528,786, filed March 30, 1944, entitled "Non-frequency selective reflectometers." Said copending application describes and claims a reflectometer wherein the standing wave ratio or the reflection coefficient may be measured at a single point on a coaxial transmission line by rotating a coupling loop to derive currents which are separately indicative of the forward and backward travelling waves on the transmission line. These currents are induced in a reflectometer line which is connected to an appropriate wave detector and indicator for indicating separately the magnitudes of the forward and backward travelling waves on the main transmission line.

The improvement over the device described in said copending application which comprises the instant invention is a correction network for compensating for discontinuities introduced into the main transmission line by the reflectometer lne connectors and by the field distortion provided by the rotatable reflectometer coupling loop. Unless such a correction network is employed, a perfectly matched load connected to the main transmission line would provide reflectometer indications which are incorrectly indicative of the load impedance and the standing wave conditions on the main line.

Among the objects of the invention are to provide an improved method of and means for measuring standing waves on a high-frequency transmission line. Another object of the invention is to provide an improved method of and means for measuring separately the forward and backward travelling waves in a high-frequency transmission circuit. Another object of the invention is to provide an improved reflectometer for measuring the reflection coefficient on a coaxial transmission line.

Other objects of the invention include improved methods of and means for measuring forward and backward travelling waves on a high-frequency transmission line by employing longitudinally fixed, rotatable pickup means coupled to said transmission line. Another object of the invention is to provide an improved means for measuring standing waves on a high-frequency coaxial transmission line wherein said measurements are substantially independent of the frequency of said standing waves. A further object of the invention is to provide an improved means for measuring standing waves on a high-frequency coaxial transmission line which includes a correction network for compensating for discontinuities introduced into said coaxial line by means of the wave measuring apparatus. Another object is to provide an improved reflectometer for measuring standing waves on a coaxial high-frequency transmission line which includes a correction network for said reflectometer for compensating for discontinuities introduced in said coaxial line by the reflectometer apparatus, and wherein the measurement accuracy is substantially independent of the impedance of the wave indicating means. A still further object is to provide an improved correction network for a reflectometer for measuring forward and backward travelling waves at a single point in a coaxial transmission line. Another object is to provide a correction network for a reflectometer for measuring the magnitudes of travelling waves on a coaxial transmission line wherein said network comprises three concentric conductors providing a resistive-reactive filter in the reflectometer indicator circuit.

The invention will be described in greater detail by reference to the accompanying drawing of which Figure 1 is a schematic circuit diagram illustrating the basic theory of a reflectometer for measuring standing waves on a high-frequency transmission line, Figure 2 is a schematic circuit diagram illustrating the basic theory of the correction circuit comprising the invention, Figure 3 is a cross-sectional view of a preferred embodiment of a reflectometer employing the novel features of the invention, and Figure 4 is a perspective exterior view of said reflectometer. Similar reference characters are applied to similar elements throughout the drawing.

The fundamental principles of a reflectometer for measuring standing waves travelling in both directions at a single point on a high-frequency transmission line are described, by way of illustration, by reference to the circuit of Figure 1. A transmission line is assumed to consist of a single conductor 1 at some predetermined distance above ground. However, it should be understood that the same principles as described hereinafter may be applied, in any manner known in the art, to coaxial or waveguide transmission systems. The reflectometer is assumed to be located at the point 2 on the transmission line 1. At this point the line voltage and current are assumed to be E, I, respectively. The forward-travelling wave on the line, representing the wave travelling from the generator to the load, is indicated by the arrow pointing from left to right and is assumed to have a voltage magnitude F. Similarly the backward-travelling wave on said line, representing the wave travelling from the load to the generator, is indicated by the arrow pointing from right to left, and the voltage magnitude thereof is represented by B.

The reflectometer comprises an inductive loop element L having a mutual inductance M with respect to the transmission line conductor 1. The capacitance between the transmission line conductor 1 and the inductor L is indicated by the capacitor C connected between the line conductor 1 and one end of the inductor L. The common terminals 3 of the capacitor C and inductor L are connected to ground through a resistor $R_c$. An indicator 4 is connected between the remaining terminal of the inductor L and ground. The indicator 4 may comprise any conventional type of wave detector such, for example, as a diode rectifier or crystal detector, having a conventional direct-current indicating meter connected therewith. If desired, the meter circuit may include amplification to increase the sensitivity thereof.

It will be seen that $$E = F + B, \text{ and } I = \frac{1}{Z_0}(F - B)$$

where $Z_0$ is the surge impedance of the transmission line.

The voltage at the junction 3 between C and $R_c$ is $$V_c = E \frac{R_c}{R_c + \frac{1}{j\omega C}} = \frac{j\omega C R_c}{j\omega C R_c + 1}(F + B) \quad (1)$$

The series voltage induced by L in the line is $$V'_L = j\omega M I = \frac{j\omega M}{Z_0}(F - B) \quad (2)$$

Where M is the mutual inductance between L and the transmission line conductor 1.

The voltage developed by $V'_L$ across $R_L$ is $$V_L = \frac{R_L}{R_L + j\omega L} V'_L = \frac{j\omega M}{Z_0} \frac{1}{1 + \frac{j\omega L}{R_L}}(F - B) \quad (3)$$

Consequently the potential difference between ground and point 2 is $$V = j\omega \left[ \frac{C R_c}{j\omega C R_c + 1} + \frac{M}{Z_0} \frac{1}{1 + \frac{j\omega L}{R_L}} \right] F$$

$$+ j\omega \left[ \frac{C R_c}{j\omega C R_c + 1} - \frac{M}{Z_0} \frac{1}{1 + \frac{j\omega L}{R_L}} \right] B \quad (4)$$

If the two conditions $$C R_c = \frac{M}{Z_0} = \frac{L}{R_L} \quad (5)$$

are satisfied, then the coefficient of B in (4) vanishes and V becomes $$V = 2j\omega \frac{C R_c}{j\omega C R_c + 1} F \quad (6)$$

Equation 6 shows that if conditions (5) are met, the output of the reflectometer is proportional only to F, the magnitude of the wave travelling to the right on the line, independently of frequency.

If at the point 2 on the line is placed a second reflectometer differing from the first only in that the mutual inductance between the inductive element L and the line conductor 1 is −M, it will be seen that when the conditions of Equation 5 are satisfied that $$V = 2j\omega \frac{C R_c}{1 + j\omega C R_c} B \quad (7)$$

Thus, if the reflectometer loop L is rotated 180° with reference to the transmission line conductor 1, it will be seen that indications of the backward-travelling wave B will be obtained since the effect of rotating the coupling loop 180° is to neutralize the capacitive and inductive loop couplings for waves travelling in the opposite direction on the transmission line.

It will be seen that in principle, the system described in said copending application differs from other known systems for high-frequency power and wave magnitude measurements in that it simultaneously incorporates all of the following desirable features. First, the device provides measurements which are not directly dependent upon frequency. Second, all transfer impedances are reactive. Third, the accuracy of the system is independent of the wave detector impedance. Fourth, accurate measurements may be made at frequencies substantially higher than are practicable with other known systems. Fifth, due to the elimination of moving probes, measurement accuracy is substantially increased in the centimeter wave range.

Figure 2 illustrates an equivalent electrical circuit of a reflectometer employing a correction network for compensating for discontinuities introduced into a coaxial transmission line by means of the reflectometer connectors and by the field distortion caused by the reflectometer coupling loop. The main transmission line comprises a coaxial line having an inner conductor 1 and an outer conductor 5 connected to a generator, not shown, and to a load impedance $Z_2$. The voltage between the transmission line conductors at a point adjacent the coupling loop L is indicated as E, and the line current is indicated as I. The mutual inductance between the inner conductor 1 of the transmission line and the reflectometer pickup loop L is indicated as M, and the capacitance between the line inner conductor 1 and the loop is indicated as C. The impedance of the reflectometer line including the matching network therefor is indicated as $Z_1$.

The characteristic impedance of the coaxial transmission line is $Z_0$ and the load impedance $Z_2$ is selected to be substantially equal thereto. The indicator impedance at the remote end of the branch reflectometer line 7, 8, is indicated as $Z_L$, and the current in the branch reflectometer line 7, 8, is indicated as $I_{out}$.

Assuming that $Z_1$ and $Z_L$ are each much less than $1/\omega C$, $$I_{out} = \frac{j\omega MI}{Z_L+Z_1} - j\omega CE\frac{Z_1}{Z_1+Z_L} = \frac{j\omega CI}{Z_L+Z_1}\left[\frac{M}{C} - Z_1\frac{E}{I}\right] \quad (8)$$

when $Z_2 = Z_0$, the surge impedance of the transmission line, $E$ and $I$ are in phase, and $E/I = Z_0$. In this case there should be no reflections on the transmission line from the load impedance $Z_2$, and therefore $I_{out}$ must be equal to zero. To satisfy this condition, it is necessary that $$\frac{M}{C} = \frac{E}{I}Z_1 = Z_0 Z_1 \quad (9)$$

which is a real quantity. Thus, in the instance providing a null indication, ($I_{out}=0$), the reflectometer line impedance $Z_1$ must be a pure resistance.

In practice, however, especially at high and ultra-high-frequencies, it is impossible to satisfy the condition of balance indicated by Formula 9 with a single resistor $R_c$ (Fig. 1 and Formula 5) in place of the network consisting of 11, 13, 15, because (1) Fixed resistors are not pure resistances at these frequencies but always include some reactance.
(2) Some discontinuity is always introduced into the main transmission line by the connectors necessary to connect the load and the generator to the transmission line portion of the reflectometer.
(3) Discontinuity also is introduced into the main transmission line due to field distortion adjacent the reflectometer pickup loop.
(4) The self-inductance of the reflectometer pickup loop has an appreciable value which may not be completely neglected.

Thus, when the transmission line, 1, 5, is terminated by a load impedance $Z_2$ equal to the characteristic line impedance $Z_0$ (exclusive of the connectors), a null indication ($I_{out}=0$) will not be obtained. Thus, an incorrect indication of the load impedance matching is provided since the effective load impedance does not appear to equal the characteristic line impedance $Z_0$. The amount of equivalent reflection coefficient for a properly matched load may run as high as 10 percent due to such discontinuities.

This defect may be remedied by matching the input of the reflectometer line 7, 8, by a network comprising a matching capacitor 11 connected between one terminal of the coupling loop L and the outer conductor 9 of the reflectometer line, and a matching resistor 13 serially connected with a matching inductance 15, both connected across the matching capacitor 11. The remaining terminal of the pickup coupling loop L is connected through a blocking capacitor 17 to the inner conductor 7 of the reflectometer line 7, 8. The reflectometer wave detector and indicator are indicated by the reflectometer load resistor $Z_L$ connected across the remote ends of the inner and outer reflectometer line conductors 7, 8.

The adjustment of the system may be as follows: A standard, accurately known load impedance $Z_2$, substantially equal to the transmission line characteristic impedance $Z_0$ is connected across the load terminals of the transmission line 1, 5. Because of the discontinuities introduced into the transmission line by the reflectometer connectors and the field distortion provided by the reflectometer coupling loop, the line voltage $E$ and current $I$ are not in phase, so that $E/I$ equals $Z$ where $Z$ has a small reactive component. The condition for null indication, ($I_{out}=0$), showing that the load impedance being measured is substantially equal to the characteristic line impedance $Z_0$ is $$\frac{M}{C} = \frac{E}{I}Z_1 = ZZ_1 \quad (10)$$

a real quantity. The relation shown in Formula 10 may be satisfied by a proper choice of the components comprising the reflectometer matching network 11, 13, 15. Since the inductive element 15 of the matching network may be made adjustable in a coaxial reflectometer line structure, the matching network may be readily adjusted to provide the desired correction.

Figure 3 shows a cross-sectional view of a preferred embodiment of the invention which comprises a short section of coaxial transmission line which is interposed between the source and the load in a conventional coaxial transmission system. The main transmission line section of the reflectometer includes an inner conductor 1 having end terminals 19 and 21 forming portions of a source connector 23 and a load connector 25, respectively. The coaxially disposed outer conductor 5 of the main transmission line section of the reflectometer has end terminals 27 and 29 forming the remaining portions of the source connector 23 and load connector 25, respectively.

The outer line conductor 5 is apertured to permit the coupling loop L of the reflectometer indicator circuit to be inserted into the main transmission line section 1, 5 in close capacitive relation to the inner conductor 1. The pickup loop L comprises a single rectangular loop consisting of a thin metallic ribbon of the order of one-eighth inch wide. One end of the loop is terminated in the blocking capacitor 17, the remaining terminal of said capacitor being terminated in one end of the inner conductor 7 of the reflectometer line. The remaining terminal of the coupling loop L is terminated near to the adjacent end of an intermediate reflectometer line conductor 8 which is concentrically disposed with respect to the inner conductor 7. The outer reflectometer line conductor 9 is concentrically disposed with respect to the intermediate conductor 8. The whole reflectometer line 7, 8, 9, including the coupling loop L, is rotatable with respect to the main transmission line section 1, 5, in a bearing 31 supported by the main transmission line outer conductor 5. Suitable stops 33, 35 cooperating with an indicator lug 37 connected to the rotatable reflectometer line, permit the coupling loop L to be rotated through an angle of 180° to provide coupling for the reflectometer indicator for either forward or backward travelling waves on the transmission line 1, 5, as explained heretofore.

The capacitance between the outer reflectometer line conductor 9 and the termination of the coupling loop L provides the matching capacitor 11 of the correction network. The termination of the coupling loop L is insulated from the intermediate reflectometer line 8 by means of an insulating sleeve 39.

The matching resistor 13 is supported by the intermediate line conductor 8 and is connected to the termination of the coupling loop L. The remaining terminal of the matching resistor 13 is terminated on the intermediate line conductor 8. The matching resistor may comprise, for example, a sleeve insulated from the intermediate conductor 8 and coated with a carbon compound to provide the desired resistance.

The variable inductive element of the correction network is provided by means of the intermediate and outer reflectometer line conductors 8, 9 and a longitudinally adjustable, short-circuiting connector 41 interposed therebetween. The longitudinal position of the short-circuiting connector 41 may be adjusted from outside of the reflectometer line by removing a section 43 of the outer conductor to provide access thereto. Thus, the variable inductive element of the correction network comprises the section of the intermediate line conductor 8 between the resistor 13 and the short-circuiting connector 41, the connector 41, and the portion of the outer conductor 9 between the connector 41 and the bearing 31.

The inner reflectometer line conductor 7 and the outer conductor 9 are terminated in a reflectometer detector 45, of the same general type as the source and load connectors 23, 25, for connection to the reflectometer detector and indicator apparatus.

As shown in the perspective view of the device illustrated in Figure 4, the entire reflectometer line 7, 8, 9, may be rotated through an angle of 180° to provide the required adjustment of the loop inductive coupling to the inner conductor 1 of the main transmission line section 1, 5.

Thus, the invention described comprises an improvement upon existing reflectometer apparatus wherein a matching network is interposed in the reflectometer line intermediate the reflectometer coupling loop and the wave detector and indicating apparatus. The correction network compensates for discontinuities introduced into the main transmission line by the reflectometer line connectors and by the field distortion provided by the reflectometer coupling loop, as well as by the small reactance associated with the matching resistor 13.

I claim as my invention:

1. Apparatus for measuring standing waves on a radio frequency transmission line including indicating means, common lumped directional means providing fixed capacitive and adjustably directional inductive coupling between said line and said indicating means to provide an indication of the magnitude of waves travelling in a predetermined direction on said line, and a correction network serially connected with said directional coupling means for compensating for discontinuities introduced in said transmission line by said coupling means.

2. Apparatus for measuring standing waves on a radio frequency transmission line including indicating means, common lumped directional means providing fixed capacitive and adjustably directional inductive coupling between said line and said indicating means to provide an indication of the magnitude of waves travelling in a predetermined direction on said line, and a correction network comprising a series capacitance, and a series resistance and an inductance connected in shunt with said capacitance, said network being connected in series with said coupling means for compensating for discontinuities introduced in said transmission line by said coupling means.

3. Apparatus for measuring standing waves on a coaxial transmission line including an indicator, common lumped non-frequency-selective directional means including a second coaxial transmission line and an aperiodic coupling loop terminating one end of said second line, means connecting said indicator to the remaining end of said second line, said loop and said second line providing inductive and capacitive coupling between said coaxial transmission line and said indicator to provide a first indication of the magnitude of forward-travelling waves on said line, means for adjusting the phase of said inductive coupling to provide a second indication of the magnitude of backward-travelling waves on said line, and a correction network connected in series with said loop and completely enclosed within said second line intermediate said coupling loop and said indicator for compensating for discontinuities introduced in said coaxial transmission line by said coupling loop.

4. Apparatus for measuring standing waves on a coaxial transmision line including an indicator, a common lumped non-frequency-selective directional means including a second coaxial transmission line and an aperiodic coupling loop terminating one end of said second line, means connecting said indicator to the remaining end of said second line, said loop and said second line providing inductive and capacitive couplings between said coaxial transmission line and said indicator to provide a first indication of the magnitude of forward-travelling waves on said line, means for adjusting the phase of said inductive coupling to provide a second indication of the magnitude of backward-travelling waves on said line, and a correction network comprising a series capacitance, and a series resistance and an inductance connected in shunt with said capacitance, said network being connected in series with said loop and said second line intermediate said coupling loop and said indicator for compensating for discontinuities introduced in said coaxial transmission line by said coupling loop.

5. Apparatus for measuring standing waves on a coaxial transmission line including an indicator, common lumped non-frequency-selective directional means including a second coaxial transmission line and an aperiodic coupling loop terminating one end of said second line, means connecting said indicator to the remaining end of said second line, said loop and said second line providing inductive and capacitive couplings between said coaxial transmission line and said indicator to provide a first indication of the magnitude of forward-travelling waves on said line, means for adjusting the phase of said inductive coupling to provide a second indication of the magnitude of backward-travelling waves on said line, and a correction network comprising a series capacitance, and a series resistance and an inductance connected in shunt with said capacitance, said network being connected in series with said loop and completely enclosed within said second line intermediate said coupling loop and said indicator for compensating for discontinuities introduced in said coaxial transmission line by said coupling loop.

6. Apparatus for measuring standing waves on a coaxial transmission line including an indicator, common lumped non-frequency-selective directional means including a second coaxial transmission line having inner, intermediate and outer conductors and an aperiodic coupling loop terminating one end of the intermediate and inner conductors of said second line, means connecting said indicator to the other ends of said inner and outer conductors of said second line, said loop and said second line providing inductive and capacitive couplings between said coaxial transmission line and said indicator to provide a first indication of the magnitude of forward-travelling waves on said line, means for reversing the orientation of said inductive coupling to provide a second indication of the magnitude of backward-travelling waves on said line, and a correction network comprising the capacitance between said intermediate and outer conductors of said second line, and a series resistor and the inductance of a short-circuited portion of said intermediate and outer conductors shunting said capacitance, said network being serially connected in said second line intermediate said coupling loop and said indicator for compensating for discontinuities introduced in said coaxial transmission line by said coupling loop.

7. Apparatus for measuring standing waves on a coaxial transmission line including an indicator, common lumped non-frequency-selective directional means including a second coaxial transmission line having three concentric conductors and an aperiodic coupling loop terminating one end of the intermediate and the inner conductors of said second line, means connecting said indicator to the remaining ends of said inner and outer conductors of said second line, said loop and said second line providing inductive and capacitive couplings between said coaxial transmission line and said indicator to provide a first indication of the magnitude of forward-travelling waves on said line, means for reversing the orientation of said inductive coupling to provide a second indication of the magnitude of backward-travelling waves on said line, and a correction network comprising an enlarged portion of the intermediate conductor of said second coaxial line providing a series capacitance adjacent said loop, and a series resistance and an inductance provided by a connection between said intermediate and outer conductors of said second line, said network being connected in said second line intermediate said coupling loop and said indicator for compensating for discontinuities introduced in said coaxial transmission line by said coupling loop.

8. Apparatus for measuring standing waves on a radio frequency transmission line including indicating means, common lumped directional loop means providing fixed capacitive and adjustably directional inductive coupling between said line and said indicating means to provide an indication of the magnitude of waves travelling in a predetermined direction on said line, and a correction network connected between said coupling loop means and said indicator, said network comprising a coaxial line having concentric inner, intermediate and outer conductors, said loop means being serially connected with a resistor and terminating adjacent ends of said inner and intermediate conductors, said indicator terminating the remaining ends of said inner and outer conductors, conductive means coupling said intermediate and outer conductors at a predetermined distance from said coupling loop means, and capacitive means coupling said intermediate and outer conductors adjacent said loop means, said network compensating for discontinuities introduced in said transmission line by said loop means.

SARAJU P. GHOSH.